United States Patent [19]
Witchger

[11] 3,806,152
[45] Apr. 23, 1974

[54] AUTOMOTIVE SAFETY SYSTEM

[76] Inventor: Eugene S. Witchger, 210 W. 77th St., Indianapolis, Ind. 46260

[22] Filed: Aug. 2, 1971

[21] Appl. No.: 168,050

[52] U.S. Cl........... 280/150 B, 296/84 K, 296/97 H
[51] Int. Cl............................................. B60r 21/06
[58] Field of Search..... 280/150 B; 296/97 R, 97 H, 296/84 K, 152, 153; 180/90, 82

[56] References Cited
UNITED STATES PATENTS

| | | | |
|---|---|---|---|
| 3,614,128 | 10/1971 | Sobkow | 180/90 X |
| 3,702,706 | 11/1972 | Sobkow | 180/90 X |
| 2,853,339 | 9/1958 | Lazarus | 280/150 B |
| 3,560,041 | 2/1971 | Foster | 280/150 B |
| 3,614,129 | 10/1971 | Sobkow | 180/90 X |
| 3,649,070 | 3/1972 | Hoyer | 296/97 H |

FOREIGN PATENTS OR APPLICATIONS

| | | | |
|---|---|---|---|
| 665,797 | 7/1964 | Italy | 296/97 R |
| 964,471 | 5/1957 | Germany | 280/150 B |
| 1,115,317 | 12/1955 | France | 280/150 B |

*Primary Examiner*—Leo Friaglia
*Assistant Examiner*—Reinhard J. Eisenzopf
*Attorney, Agent, or Firm*—Woodard, Weikart, Emhardt & Naughton

[57] ABSTRACT

A system for protecting the occupants of a passenger car by a new impact geometry of crash pads and visors which move into effective protective position upon application of force thereto from the occupant upon impact. These elements are used to absorb energy, reduce abrasion, and disperse unit pressures to a level of human tolerance, when the occupant is thrust toward glass and body structure upon impact. The greatest advantage of this novel restraining means can be accomplished by using these protective pads and visors in combination with laminated safety glass in the windshield and side windows.

12 Claims, 3 Drawing Figures

INVENTOR
EUGENE S. WITCHGER
BY
Woodard, Weikart, Emhardt & Naughton
ATTORNEYS

AUTOMOTIVE SAFETY SYSTEM

BACKGROUND OF THE INVENTION

1. Field of the Invention

This invention relates generally to means for the protection of passengers of motor vehicles, and more particularly to protection of passengers from injury in the event of collision of a vehicle.

2. Description of the Prior Art

Current and prior art has relied largely upon belt-type restraining devices. Another approach has employed comparatively voluminous padding, permanently positioned and confining passengers in uncomfortably small areas. Another approach is to employ rapidly inflatable bags arranged to be deployed instantly in protective positions upon vehicle impact. They are comparatively complex and expensive, and, thus far, are somewhat unpredictable. The present invention is intended to overcome various shortcomings of existing state-of-the art devices and systems, to make the safety glass and other car elements more functional and to give more side protection.

Summary of the Invention

Described briefly, the system of the present invention typically employs an arrangement of pads mounted to the vehicle structure in such strategic locations and in such a manner that impact of a portion of the occupant's body therewith will move the engaged pad into a protective position covering some comparatively rigid vehicle structure and glass area which might otherwise be contacted by the body. Such pads thereby provide the protection needed, when and where needed, but otherwise are disposed out of-the-way of the occupants.

DESCRIPTION OF THE PREFERRED EMBODIMENT

A part of the philosophy of the present invention is that front seat passengers, particularly the driver, are in a safer and better position to see the road when the eye level is maintained above a certain minimum height. Below this level, the view of the road is inadequate. This is true in any vehicle. Thus a driver should not be allowed to operate a vehicle if his eye level is below the prescribed safe height. Such a requirement should not work a particular hardship on persons who are of sufficient age to become licensed drivers, because the increasing availability of significant and widely variable seat adjustments in vehicles, particularly with "six-way" power seats will accommodate persons of considerable variation in stature. Besides, prospective drivers who are still too short, should use pillows or lifts.

In addition to the visibility attainable by establishing minimum eye level position for operators, I believe that the human body can be protected much more effectively than it is with devices currently in use. Sun visors can be effective protectors when properly mounted in accordance with my new proposed geometry. Crash pads at both the front and sides can also offer improved protection, particularly when the top of the pad is substantially above the bottom edge of the windshield and side window opening. The comparatively high lip of such pads does not interfere with visibility, when the eye level is proper.

Another part of the philosophy of the present invention is my belief that it is important to make use of all components of the vehicle to work together toward safety, while avoiding complex components which can cause trouble and cost money to produce and maintain and afford no advantages in terms of dependability.

The foregoing beliefs are implemented according to my invention by providing minimum eye-level markers on the roof support posts of the vehicle, and crash pads mounted to the doors, dash and visors, the pads being at heights and locations such that they are deflectable upon impact therewith, in a preferred direction toward and against the safety glass of the vehicle. That is to say that they are constructed and arranged so that upon impact therewith of a passenger inside the passenger compartment, their deflection or deformation will be toward the glass to cover it on the inside. In its most current state of development, some laminated safety glass can afford a flexible, resilient but shatter-proof restraining function, to limit the travel of the deflected padding. The driver and passengers are thereby protected by means which are comparatively simple in construction and arrangement and susceptible to attractive design and material surface treatments to provide a spacious, attractive and yet protective environment for the vehicle occupants.

Figure 2:
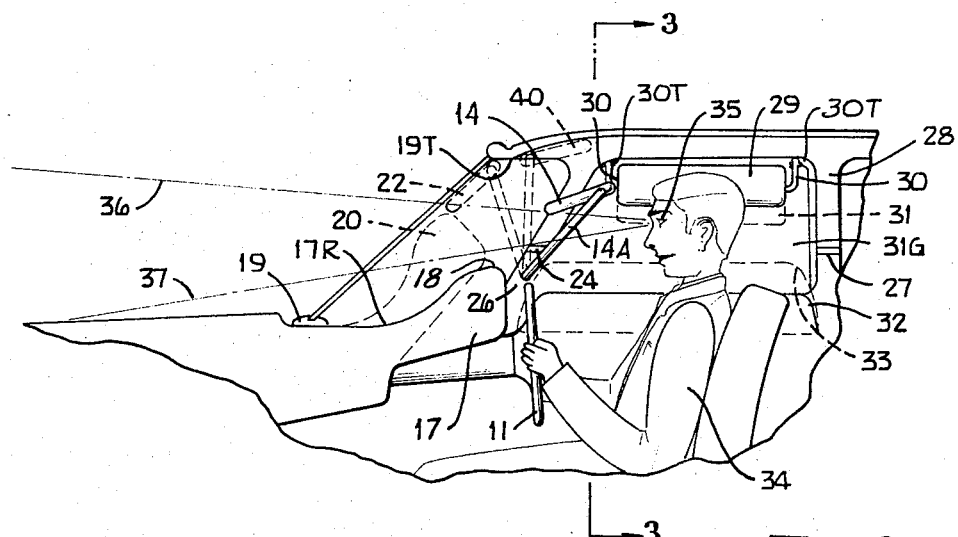
FIG. 2 is a side view into the interior of the vehicle at the front seat, the view being taken at line 2—2 in FIG. 1 and thereby omitting the left-hand front corner pillar ("A" post) to improve the clarity of the illustration.

Referring now to the drawings in detail, the steering wheel 11 is of collapsible construction. Other components include the windshield 12, the front corner pillars ("A" posts) 13, front sun visors 14 and 15, rear view mirror 16 and dash board crash pad 17. As is best shown in FIG. 2, the top 18 of the crash pad 17 is located substantially above the bottom edge 19 of the windshield 12. The top of the windshield opening is shown at 19T. The dotted lines 20 in FIG. 2 show the upwardly and forwardly displaced protective position of the crash pad 17, covering an increased projected area of the windshield window. Controlled rigidity at 17R contributes to this preferred mode of deflection.

The dotted line 22 shows the displaced protective position of the visor 14. The low pivot points 25 and 26 of the visor mounting arms 14A contribute to the preferred mode of deflection of the visor to a position against the glass.

Figure 1:
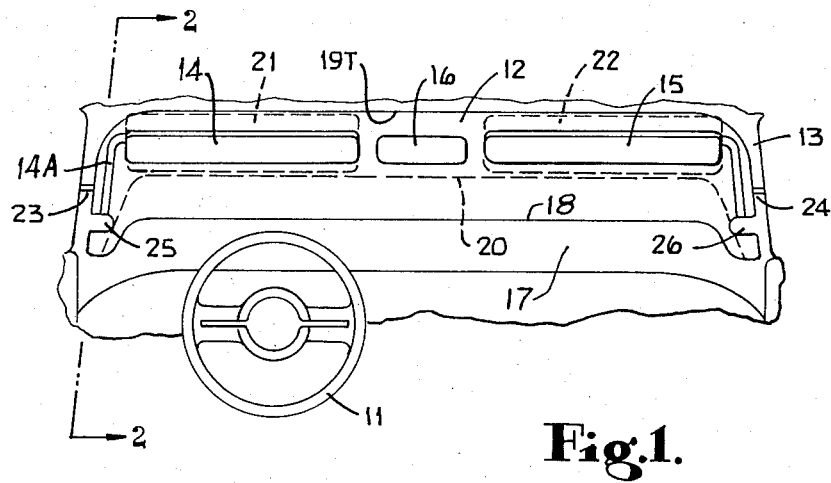
FIG. 1 is a view looking from the front seat of the vehicle forward through the windshield and showing the front safety visors and their relatively low hinge point, the crash pad dash, and the eye level indicator.

The minimum eye level indicators on the "A" posts are shown at 23 and 24 in FIG. 1. Also the comparatively low pivot points for the visors are shown at 25 and 26 in FIG. 1. The eye level indicators 24 and 27 for the right-hand "A" post and "B" post 28, respectively, are shown in FIG. 2. In the illustrated example it will be noted that the eyes of the driver are above the minimum eye level indicators and thus he has a completely adequate view of the exterior. In no event, however, should a driver be permitted to operate the vehicle if his or her eye level is below the minimum defined by the indicators.

Figure 3:
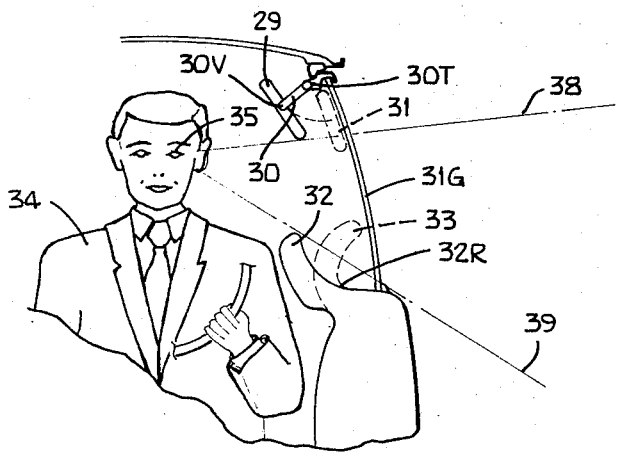
FIG. 3 is a fragmentary section of the driver's side, the section being taken at line 3—3 in FIG. 2 and viewed in the direction of the arrows and showing the side door crash pad arrangement and the side visor which is attached to the top of the door frame in a position to shade the eyes.

As shown in FIGS. 2 and 3, the side visor 29 is mounted to a pair of arms 30 hinged to the top of the door frame at 30T, and the visor can be hinged to the arms at 30V. It is thereby movable from the position shown by the solid lines in FIGS. 2 and 3, to the protective positions shown in the dotted lines 31, against the side window 31G.

The side door panel crash pad is shown in its solid line position 32 which is its normal upright position, and its outwardly pushed protective position is shown at 33, covering additional glass area. Controlled rigidity at 32R contributes to this preferred mode of deflection.

FIG. 2 shows the front sun visor 14 in the solid outline, and shows it in a protective position against the glass by the dotted outline 22, and also shows it in a stored position 40 against the headlining of the body.

It is desirable that the padding, or at least portions thereof, have some energy absorbing characteristics so as to dissipate energy during deformation. It is also desirable that they have some "memory" characteristics in order that they may at least tend to return eventually to original configuration, so that a minor impact or a comparatively light force over some duration applied thereto would not result in a permanent deformation. For example, it would be desirable to be able to lean against the door panel padding 32 for a period of time, which might result in deformation to some extent, but have the padding then return to its normal original position after the force is removed. The same is true for the dash crash pad.

The pivotal mounting of the front visor support arms at the mounting points 25 and 26, below eye level, should be a friction type mounting, many of which are readily available, in order that the visor support arm (14A, for example) can be pushed forward about its pivot axis to move it to the intermediate dotted outline position shown in FIG. 2 whereupon the visor can be turned backward up against the passenger compartment ceiling headlining material and stored as shown at 40. Then, once the driver has assumed his sitting position in the car, he can pull the visor rearward and turn the visor down to the normal operating position shown in the solid outline.

In the event of front end collision, his head striking the visor will push it and thereby the support arm 14A forward to the forwardmost dotted outlined position to distribute the force, through the pad, against the windshield. As mentioned above, the nature of some of the windshield safety glasses becoming available today is such as to deflect and absorb energy before breaking. Thus, while the glass may eventually break, as a result of the load from one or several passengers, for example, the unit pressure on the head of any individual is minimized and there is no danger of being cut.

It is believed preferable that the pivot points for the side visors also be of a friction nature in order to permit some adjustment for convenience of the driver and appropriate shading from the sun, as well as proper disposition for safety in the event of lateral movement in a collision.

While it is believed that various forms of polyurethane foam or other semi-rigid material would be quite suitable for the flexible pads, undoubtedly many other materials would be equally suitable.

It may be understood from the foregoing description that the present invention is capable of providing a synergistic effect by virtue of its unusual disposition and combination of components. For example, the front sun visors are hinged at the low point so as to move down and forward with the head toward the windshield or side window, in contrast to present visors which hinge upward. Yet it is possible to swing the visor of the present invention upward and out if the way, when desired.

FIGS. 2 and 3 show the clear view outward from the driver's eye despite the comparatively high level of the tops of the safety protection padding. As shown, the driver 34, has his eye 35 above the safe driving level indicators 23, 24, 27 and his range of view forward indicated by lines 36 and 37, is unobstructed by the visor 14 and the top edge of the crash pad 18. The side view (indicated by lines 38 and 39) is likewise unobstructed by the visor 29 and the high extending crash pad door panel 32.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. In a vehicle having a passenger compartment with seat and window openings therein, a safety system comprising:

a crash pad in said compartment adjacent one of said window openings and projecting into a space between said one window opening and said seat, said pad having a preferred direction of deformation under crash conditions to cover a projected glass area greater than the area normally covered thereby, and a window in said one opening, said pad normally projecting inwardly and upwardly with respect to an area therein of controlled rigidity at the mounting thereof to the vehicle, and covering a relatively small horizontally projected area with respect to said one window opening, and being deformable primarily around said area of controlled rigidity upward and outward toward and against a window in said one opening to cover a larger horizontally projected area, and said window serving as a restraining stop for said pad.

2. The combination of claim 1 and further comprising:

a safety glass in said window opening having a characteristic of resilient restraining action against an impact force applied thereto.

3. In a vehicle having a body structure with a seat therein for supporting an occupant, and window openings for windows to provide a view to the exterior for an occupant on the interior, a safety system comprising:

reference means provided on said body structure to designate a minimum level below which the eye of an occupant seated in said seat would have an obstructed view through said window openings, a padded visor disposed above the level of said reference means and between said seat and one of said window openings, a visor support arm pivotally connected to said visor and pivotally connected to said structure, the pivotal connection to the visor being above said minimum eye level reference means, and the pivotal connection to the structure being below said minimum eye level reference means, said visor being movable forwardly and downwardly about said pivotal connection to the structure.

4. The system of claim 3 wherein:

the pivotal mounting of said visor to said arm accommodates folding upward of said visor against interior ceiling of said body structure and the pivotal mounting of said arm to said body structure permits manual forward movement of said arm to a position accommodating storage of said visor against said ceiling.

5. In a vehicle having a body structure and seating means disposed in said body structure to seat an occupant within said body struture, and openings in said body structure for windows providing a view to the exterior for an occupant located on said seating means, the safety system comprising:

a side window upper frame member, pivot arm means pivotally mounted on a first horizontal axis to said frame member to pivot in a vertical plane, a pad pivotally mounted to said pivot arm member on a second axis parallel to said first axis, said pad being disposed inwardly with respect to said side window frame and toward said seating means, said pad and arm means being pivotal downwardly against a window in said frame member upon impact with said pad of a head of a person sitting in such seating means during relative lateral movement between said body structure and the head of said person seated in said such seating means.

6. The system of claim 5 wherein:

said side window upper frame member has a side window bordered thereby; and said pad has an outer face generally parallel to and spaced inwardly from said window and movable outwardly into engagement with said window upon downward and outward pivoting of said arm means.

7. In a vehicle having a body structure and having seating means disposed in said body structure to seat an occupant within said body structure, and openings in the front and sides of said body structure with windows in said openings providing a view to the exterior for the eye of an occupant sitting on said seating means, the safety system comprising:

front and side padded visors movably mounted to said structure and horizontally spaced inwardly from said front and side openings respectively, above an imaginary eye-level reference plane, front and side crash pads movably mounted to said structure and horizontally spaced inwardly from said front and side openings respectively, below said reference plane, said visors and pads being normally vertically spaced to provide a substantial unobstructed viewing area from a point in said reference plane above said seating means, through said openings;

said pads and visors being energy absorbent and deflectable in predetermined paths toward and against said windows by outwardly directed force applied thereto, to positions at said openings and substantially occluding said openings and restrained by said windows therein;

to absorb energy when moved by impact of an occupant, and distribute force of impact over a large area whereby unit pressure on the occupant is minimized.

8. In a vehicle having a body structure with a seat therein for supporting an occupant, and window openings for safety glass windows to provide a view to the exterior for an occupant on the interior, a safety system comprising:

a padded visor between the seat and one of said window openings and disposed above an occupant eye level reference, a visor support arm pivotally connected to said visor and pivotally connected to said structure, the pivotal connection to the visor being above said reference, and the pivotal connection to the structure being below said reference, said visor being movable forwardly and downwardly about said pivotal connection to the structure, a crash pad adjacent each window opening and extending into the passenger compartment substantially higher than the glass opening and deformable about a controlled weakness area to provide a pivotal action allowing said pad to cover substantially more glass area upon the impact of the passenger against it under crash conditions, the total restraining action of the pad system being made up of the capability of the pad and the safety glass.

9. The system of claim 8 wherein:

over 30 percent of the restraining capability is contributed by said safety glass.

10. The system of claim 9 and further comprising:

additional visors having pivotal relationship allowing said visors to move over a greater glass area after impact than in the normal position of the visors for driving.

11. The system of claim 10 wherein:

said additional visors are side visors pivotally connected to said structure for movement of said side visors over a greater glass area upon side impact.

12. The system of claim 8 wherein:

over 50 percent of the restraining capability is contributed by said safety glass.

* * * * *